Figure 1:
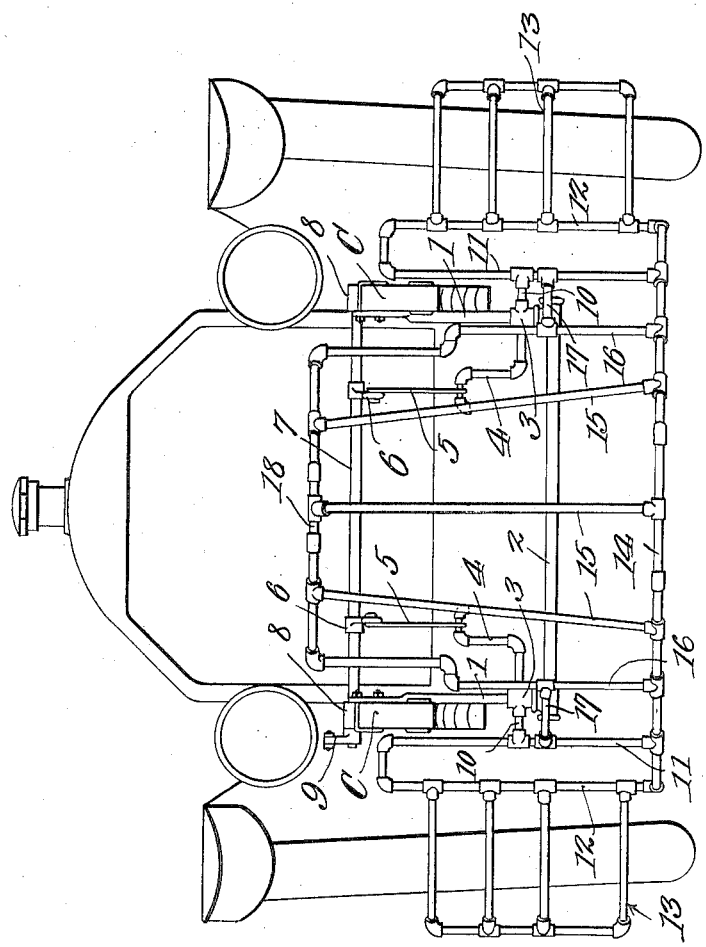

C. PELTER, T. H. SPRY & C. F. BUSSE.
AUTOMOBILE FENDER.
APPLICATION FILED MAY 24, 1913.

1,089,006.

Patented Mar. 3, 1914.
2 SHEETS—SHEET 1.

Charles Pelter,
Townsend H. Spry and
Charles F. Busse Inventors,

Witnesses by C.A.Snow & Co.
Attorneys.

C. PELTER, T. H. SPRY & C. F. BUSSE.
AUTOMOBILE FENDER.
APPLICATION FILED MAY 24, 1913.
1,089,006.
Patented Mar. 3, 1914.
2 SHEETS—SHEET 2.
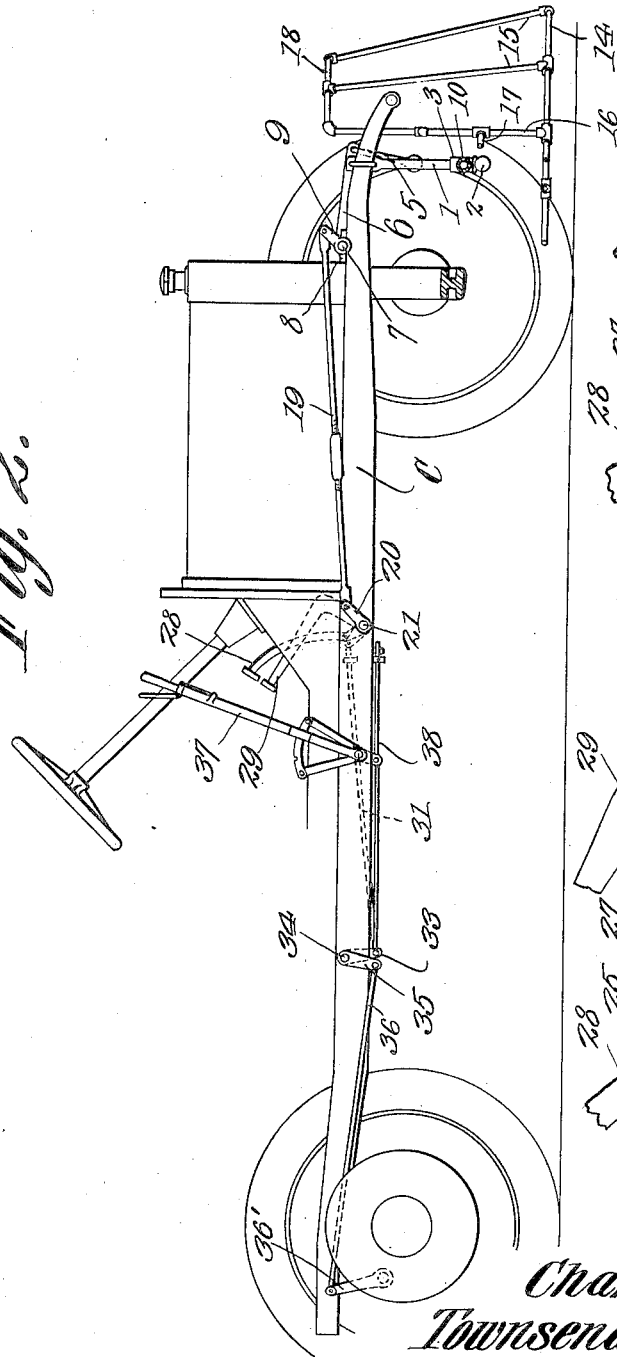
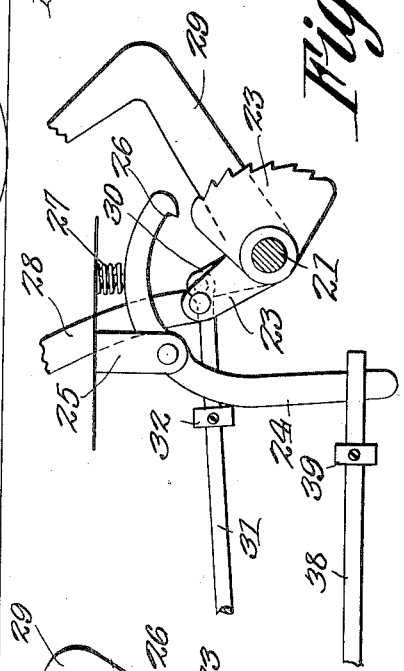
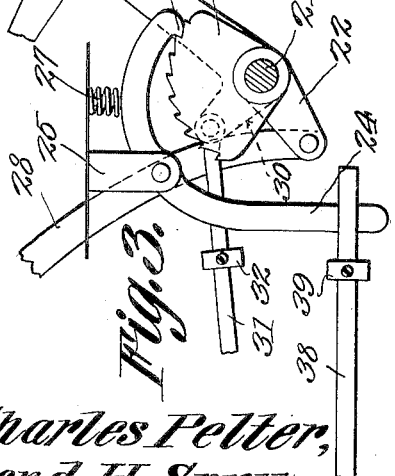
Charles Pelter,
Townsend H. Spry and
Charles F. Busse Inventors,
by C.A.Snow & Co.
Attorneys.
Witnesses

UNITED STATES PATENT OFFICE.

CHARLES PELTER, TOWNSEND H. SPRY, AND CHARLES F. BUSSE, OF WALLA WALLA, WASHINGTON.

AUTOMOBILE-FENDER.

1,089,006.  Specification of Letters Patent.  Patented Mar. 3, 1914.

Application filed May 24, 1913. Serial No. 769,733.

*To all whom it may concern:*

Be it known that we, CHARLES PELTER, TOWNSEND H. SPRY, and CHARLES F. BUSSE, citizens of the United States, residing at Walla Walla, in the county of Walla Walla, State of Washington, have invented a new and useful Automobile-Fender, of which the following is a specification.

The present invention relates to improvements in fenders, one object of the invention being the provision of a gravity operated fender for attachment to a motor vehicle and having mechanism controlled from the foot and emergency brake mechanism to automatically release the fender, such means being manually controlled from the seat to return the fender to normal out of use position.

A still further object of the present invention is the provision of a novel fender structure which is adapted to be vertically slidable at the front end of the automobile and provided with a plow central portion and with wings in front of the front wheels, said wings extending beyond the outer edges of the wheels, so as to provide a deflecting fender to prevent the passage of a body beneath the wheels.

A still further object of the invention is the provision of a fender which by gravity will fall or slide into object impact position and which is locked in its uppermost position to be released either by the foot lever or the emergency lever of the automobile.

With the foregoing and other objects in view which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the drawings Figure 1 is a front elevation of the fender as applied to an automobile. Fig. 2 is a side elevation thereof with an automobile and the foot and emergency brake mechanism shown in diagram. Fig. 3 is a view illustrating means for locking the fender in its uppermost position. Fig. 4 is a similar view showing the fender released due to the operation of the foot lever for operating the brake.

Referring to the drawings, the numeral 1 designates two vertical standards which are connected to the forward ends of the chassis C of the automobile, and support upon the lower ends, the retaining bar 2, which is disposed transversely of the automobile. A coupling 3 is slidably mounted upon each of the two standards 1 above the bar 2, and carries the inwardly projecting arm 4, there being two of these arms, while in order to operably connect the arms for vertical movement upon the standards 1, either manually or by gravity, the two links 5 are connected to the two arms 6 of the rock shaft. 7. This rock shaft 7 is journaled transversely of the chassis C in the straps 8, and carries upon one end the operating arm 9.

The mechanism for operating the shaft will be set forth in detail later on.

Connected to the coupling 3 and extending in opposite directions to the arms 4, are the short couplings 10, which are connected to the two vertical rods 11, which support the parallel rods 12 carrying the outwardly extending wheel guarding wings 13. The lower ends of the rods 11 and 12 are connected together by means of the curved rod 14, which extends in the nature of a plow or cow catcher having upstanding therefrom, the inclined rods 15 centrally thereof and the vertical rods 16 all of which are connected together at their upper ends by the rod 18. The rods 16 are braced to the rods 11 intermediate of their ends by means of the braces 17 so that the complete fender structure is bodily carried by the coupling 3 so that when the arms 4 are elevated, the complete fender structure will be elevated and when released or lowered, such structure will be lowered into object striking or fender position.

In order to hold the fender in proper elevated position, so that the lower rods 14 will be at the desired height above the ground, to prevent being struck by any obstructions in the road that a car would ordinarily pass over without injury, an adjustable rod 19 is connected to the arm 9 and extends rearwardly, the same being connected to the arm 20 of the transverse shaft 21. It is desirable to rock the shaft 21 to impart the desired lifting movement to the arms 4 and fender structure so that the toothed segment 23 keyed upon the shaft 21 may be engaged by the pawl 24 mounted in the bracket 25, as clearly shown in Figs. 3 and 4, to engage the ratchet, as shown in Fig. 3, and thus hold the fender structure elevated. An arm 22 is keyed to the shaft 21, and through the foot lever 28, said shaft 21 may be manually rocked so as to elevate the fender to move the toothed segment from the position shown in Fig. 4, to that shown in Fig. 3.

The locking and releasing member 24 is provided with the hook terminal 26, which due to the spring 27 is normally held in engagement with the toothed segment 23, so that when the fender is in uppermost position, the locking member 24 will maintain through the shaft 21 and the rod 19, the shaft 7 in such position as to hold the fender in its uppermost position.

In order to provide a means for releasing the fender structure to gravity so that the same may fall and assume a position in close proximity to the surface traversed, the foot lever 29 is mounted for oscillation independent of the shaft 21 and has its arms 30 connected to the rod 31, said rod 31 extending rearwardly and engaging the depending arm 33 of the transverse shaft 34, the arm 35 of such shaft being keyed thereto and having a rod 36 extending rearwardly thereto to the brake operating lever 36′.

Under normal conditions, when an operator is simply using the foot lever 29 to stop the vehicle gradually, the rod 31 will be pulled upon but the stop or lug 32 will not be moved sufficiently far to engage the lower end of the releasing pawl or member 24, but should the foot lever be operated suddenly, such lug 32 will engage the free end of the locking member 24, thus elevating the hook 26 from engagement with the toothed segment 23, so that the parts will assume the position as shown in Fig. 4, and the fender structure will fall by gravity to its lowermost position.

In order to provide a means whereby the fender will be released to fall to its lowermost position when an emergency occurs, the emergency lever 37, which may be made in any form, is operated. The rod 38 operated by the emergency lever 37 is extended forwardly and carries the projection or lug 39 which is disposed in the path to engage the lower free end of the locking and releasing member 24, the rod 38 being extended and connected to the shaft 34, so that the brake lever 36′ is operated similarly to the operation when the foot lever 29 is used. This projection or lug 39 will strike the lower free end of the locking lever or member 24 and will operate the same similarly to move the stem 26 from engagement with the toothed segment 23 so that the parts will assume the position from that shown in Fig. 3 to that shown in Fig. 4. Thus it will be seen that when the emergency lever 37 is operated and the car suddenly brought to a halt, that the fender structure will be automatically released to object receiving or striking position.

What is claimed is:

1. The combination with an automobile chassis, and a brake mechanism including an emergency lever and a foot lever, of a fender structure mounted at the forward end of the chassis for movements to and from the surface traversed, said fender structure moving to the lowermost position by gravity, a rock shaft journaled transversely of the chassis and operably connected to the fender structure for elevating the fender, means for operably connecting the rock shaft to the emergency lever and foot lever, coöperable locking means carried by the latter means and disposed to be engaged when the mechanism is operated unduly by the foot lever or at any time by the emergency lever, and manually controlled means for operating the rock shaft to elevate the fender.

2. The combination with an automobile chassis, and a brake mechanism including an emergency lever and a foot lever, of a fender structure mounted at the forward end of the chassis for movement to and from the surface traversed, said fender structure moving to the lowermost position due to gravity, a rock shaft journaled transversely of the chassis and operably connected to the fender structure for elevating the fender, transverse shafts mounted in the chassis adjacent the foot and emergency levers, means operably connecting the transverse shafts to the rock shaft, coöperable locking means carried by the last shaft and disposed in the path to be engaged when the mechanism is operated unduly by the foot lever or at any time by the emergency lever, and manually controlled means for operating the transverse shaft to elevate the fender.

In testimony that we claim the foregoing as our own, we have hereto affixed our signatures in the presence of two witnesses.

CHARLES PELTER.
TOWNSEND H. SPRY.
CHARLES F. BUSSE.

Witnesses:
FRED J. IRWIN,
ALLEN H. REYNOLDS.